United States Patent [19]

DePasquale et al.

[11] Patent Number: 4,775,725

[45] Date of Patent: Oct. 4, 1988

[54] SILANE MODIFIED POLYMERS

[75] Inventors: Ralph J. DePasquale; Michael E. Wilson, both of Jacksonville, Fla.

[73] Assignee: PCR, Inc., Gainesville, Fla.

[21] Appl. No.: 33,861

[22] Filed: Apr. 3, 1987

Related U.S. Application Data

[63] Continuation-in-part of Ser. No. 737,875, May 28, 1985, abandoned.

[51] Int. Cl.$^4$ ............... C08L 61/20; C08L 71/02; C08L 83/04
[52] U.S. Cl. .................. 525/403; 525/408; 525/409; 525/417; 525/477; 525/509; 525/519; 525/523; 528/27; 528/28
[58] Field of Search .......... 528/27, 28; 525/403, 525/408, 409, 417, 509, 519, 477

[56] References Cited

U.S. PATENT DOCUMENTS

| | | | |
|---|---|---|---|
| 2,973,383 | 2/1961 | Black | 528/28 |
| 3,341,501 | 9/1967 | Hedrick et al. | 525/431 |
| 3,441,534 | 4/1969 | Knaub | 525/403 |
| 3,637,550 | 1/1972 | Spraver et al. | 525/431 |
| 3,664,982 | 5/1972 | Preston et al. | 525/417 |
| 4,062,693 | 12/1977 | Berger | 106/308 Q |
| 4,105,465 | 8/1978 | Berger | 106/308 Q |
| 4,151,154 | 4/1979 | Berger | 260/40 R |
| 4,352,917 | 10/1982 | Tripp | 528/28 |
| 4,463,115 | 7/1984 | Hirose et al. | 525/403 |
| 4,540,486 | 9/1985 | Ramsden | 210/198.2 |

*Primary Examiner*—Wilbert J. Briggs, Sr.
*Attorney, Agent, or Firm*—Hedman, Gibson, Costigan & Hoare

[57] ABSTRACT

There is provided a novel product having the formula:

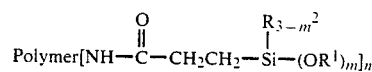

where "polymer" is an amine functional polymer, such as amine terminated polyethylene imine, amine terminated polyalkylene glycols, amine terminated aniline-formaldehyde, amine terminated nylons, amine functional silicones; $R^1$, $R^2$, and $R^3$ are $C_1$–$C_8$ monovalent hydrocarbyl radicals, m is 1 to 3 and n is 1 to 10.

17 Claims, No Drawings

SILANE MODIFIED POLYMERS

This is a continuation-in-part of co-pending application Ser. No. 737,875 filed on May 28, 1985, now abandoned.

This invention relates to certain silane modified polymers, and more particularly to the modification of amine terminated polymers with a carboxyalkylalkoxysilane.

BACKGROUND OF THE INVENTION AND PRIOR ART

Heretofore, various olefin-, amino-, or hydroxyl-functional polymers have been modified with silicon containing reagents, such as hydrido-silane, silane isocyanate; silane alkyl chlorides, etc. Silane isocyanate, for example, is expensive. Silane alkyl chlorides leave residual chloride in the product and hydrido silanes require a catalyst which introduces processing difficulties.

It has been found that silicon may be easily introduced into amine terminated polymers using a carboxyalkylalkoxysilane as the reagent. We believe that the reaction is novel and the products are novel.

BRIEF STATEMENT OF THE INVENTION

Briefly stated, the present invention is in the reaction product of (a) an aminofunctional polymer having the structure:

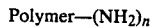

wherein "polymer" is selected from $(CH_2CH_2NH)_{2-100}$; $(CH_2-CH_2-O)_{2-100}$; $(CH_2CH(CH_3)-O-)_{2-100}$; copolymers of propylene glycol and ethylene glycol; $(NH_2-\emptyset-CH_2-)_{2-100}$; $(Si-O-)_{2-100}$ and n is a whole number from 1 to 10, and (b) an alkoxysilane having the general formula:

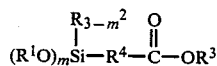

wherein $R^1$, $R^2$ and $R^3$ are independently selected from $C_1$-$C_8$ monovalent hydrocarbyl radicals, $R^4$ is alkylene containing from 1 to 3 carbon atoms and m is a whole number from 1 to 3; the number of moles of (b) being no greater than n; and said reaction being carried out in a dry environment at a temperature of from 90° C. to 160° C., and the molar ratio of (b) to (a) being from 1:2 to 10:1.

DETAILED DESCRIPTION OF THE INVENTION

As indicated above, this invention contemplates the novel reaction between an amine terminated polymer and a carboxyalkyl alkoxysilane which is represented as follows:

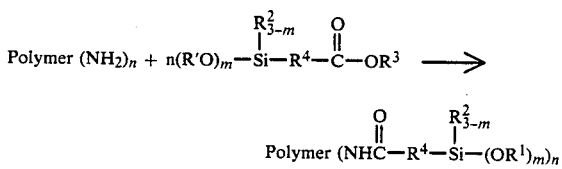

The "polymer" group is selected from polyethyleneimine, $(CH_2CH_2-NH)_{2-100}$; polypropylene glycol, $(CH_2CH(CH_3)-O-O)_{2-100}$; polyethylene glycol, $(CH_2CH_2-O)_{2-100}$; copolymers of polyethylene glycol and polypropylene glycol; anilineformaldehyde resin, $(NH_2-\emptyset-CH_2)_{2-100}$; and $(Si-O-)_{2-100}$. $R^1$, $R^2$ and $R^3$ are independently selected from $C_1$-$C_8$ hydrocarbyl including methyl, ethyl, propyl, isopropyl, butyl, isobutyl, pentyl, isopentyl, 3-methylbutyl, hexyl groups, cyclohexyl, heptyl groups, octyl groups, phenyl, 4-methylphenyl, etc. $R_4$ is an alkylene radical containing from 1 to 3 carbon atoms. The number of alkoxy groups, m, ranges from 1 to 3. The number of $-NH_2$ groups, n, ranges from 1 to 10. $\emptyset$ as used herein represents phenyl.

The process of this invention contemplates reacting in a dry environment, e.g., a nonaqueous medium, preferably with an inert gas blanket, an amine terminated polymer as above defined, with a carboxyalkyl alkoxy silanes at a relatively low temperature preferably in the range of 90° to 160° C. Desirably, the reaction is carried out in a solvent such as, methanol, ethanol, propanol, dimethyl sulfoxide, etc. A catalyst, especially an alkali metal alkoxide such as sodium methoxide, sodium ethoxide, potassium methoxide, potassium ethoxide, potassium isopropoxide, etc., apparently catalyzes an exchange reaction between a methanol solvent and the ethoxy groups of the silane and ester to yield the methoxy homologue. The latter reacts more rapidly with the amine groups. Alternatively, the methyl analog of the carboxyethyltriethoxysilane may be used without the alkoxide catalyst.

Among the advantages of this novel method of silanating functional polymers are the relatively low cost and availability of the silane esters, and the ease of processing. The silanated functional polymers are useful as paper and textile sizing agents, stabilizers for silicate solutions, floatation aids, treating agents for fillers for paper and plastics, hydrophilic coatings for glass, plastics, and minerals, aids for pigment dispersion, anticorrosion agents for metal surfaces, and adhesion promoters for metal primers and paints. The products are soluble in methanol and application is conveniently from a 0.1% to 15% solids solution in the alkanol. To coat metal surfaces, e.g., iron or steel, a 10% solids solution in methanol is applied to the metal and the solvent evaporated spontaneously or with heat. The coated metal surface resists salt corrosion and improves adhesion of primers and paints to the surface.

It is convenient to illustrate the process and representative illustrative only and not to be construed as limiting the invention to the scope thereof.

EXAMPLE I

Preparation of a Silane Modified Polyethylene Imine

According to the best mode of carrying out our invention to a solution of 58.1 g. (0.22 mole) of 2-carboethoxyethyltriethoxysilane in 100 ml of dry methanol were added 5.0 ml. of 25% sodium methoxide in methanol. About 80 ml. of alcohol distillate was collected under nitrogen before adding 75 ml. of methanol and collecting another 75 ml. of alcohol distillate. A solution of 60 g. (0.10 mole) of amine terminated polyethylene imine (mw 600) in 30 ml. of methanol was added and the reaction mass heated slowly to 90° C. with continuous removal of distillate. Infrared analysis at this point revealed strong amide peaks at 1660 and 1530 cm$^{-1}$, and an absence of the ester peaks at 1730 cm$^{-1}$.

The product weighed 119 g. (125%) due to retained methanol; was a slightly cloudy pale yellow oil. An IR scan of the neat film on NaCl showed peaks at 3350, 1655, 1550, 1090 and 810 cm$^{-1}$. The product was dissolved in ethanol because the neat product gels quickly in moist air.

A portion of the ethanol solution was diluted with water, and a glass slide dipped into the aqueous/alcohol solution. Drying and curing the coating at 100° C. for 30 minutes produced a hard, hydrophilic, water insoluble film.

EXAMPLE II

Preparation of Silane Modified Amine Terminate Propylene Oxide Capped Polyethylene Glycol To a solution of 58.1 g. (0.22 mole) of 2-carboethoxyethyltriethoxysilane in 100 ml. of dry methanol under nitrogen were added 5.0 ml. of 25% sodium methoxide in methanol. The reaction mass was heated to distill out about 90 ml. of alcohol. A solution of 60 g. in 60 ml. dry methanol of Jeffamine ED 600 (amine terminated, propylene oxide capped polyethylene glycol (MW 600) from Texaco Chemicals) was added, and the reaction mass heated to 150° C. over a period of 3 hours and held there for 1 hour. 80 ml. of distillate were recovered. IR analysis showed that only a trace of unreacted ester remained. The reaction mass was cooled to 90° C. Ethanol was added to a weight of 200 gms. (50% solids) of clear, yellow solution.

An IR scan of the neat film showed peaks at 3300, 1735 (small), 1650, 1535, 1100, 955 and 810 cm$^{-1}$. NMR (CDCl$_3$) 0.8–1.5 (m; rel area 4), 2.1–2.4 (m; rel. area 1); 3.1–4.2 (m; rel. area 12) with peaks at 3.55 (Si—OCH$_3$) and 3.63 ppm (polyethylene glycol). A glass slide was treated as in Example I and gave a hard, clear, water insoluble hydrophilic film.

EXAMPLE III

Preparation of Silane Modified Polyethylene Imine

To a solution of 82.5 g. (0.33 mole) of 2-carboethoxyethyltriethoxysilane in 100 ml dry methanol under nitrogen were added 5.0 ml of 25% sodium methoxide in methanol. The mass was heated to 100° C. to give 105 ml. of alcohol distillate. A solution of 37.5 g. (0.15 mole) of polyethylene imine (M. W. 250) in 50 ml dry methanol was added, and the reaction mass heated to 100° C. giving 70 ml. of distillate and a slightly cloudy, pale yellow, thick solution. The hot solution was diluted with enough n-butanol to give 200 g. of product (50% solids). The analysis was the same as for Example I.

EXAMPLE IV

Preparation of a Silane Modified Polypropylene Glycol

A solution of 45.8 g (0.22 mole) of 2-carbomethoxyethyltrimethoxysilane, 5.0 ml of 25% sodium methoxide in methanol, and 200 g (0.10 mole) of Jeffamine D-2000 (amine terminated polypropylene oxide, M. W. of 2000, from Texaco Chemicals) is gradually heated to 160° C. under nitrogen. After 2 hours at 160° C., 14 ml of alcohol distillate are collected. IR analysis shows that only a trace of unreacted ester remains. The reaction is cooled to 90° C. and ethanol added to give a product weight of 460 g (50% solids) of clear yellow solution. A glass slide is treated as in Example I with similar results.

EXAMPLE V

Preparation of a Silane Modified Polyethylene Imine

To 78.0 g (0.33 mole) of 2-carboethoxyethyldiethoxymethylsilane in 100 ml dry methanol under nitrogen are added 5.0 ml of 25% sodium methoxide in methanol. The mass is heated to 100° C. to give 107 ml of alcohol distillate. A solution of 180 g (0.15 mole) of polyethylene imine (M. W. 1200) in 200 ml dry methanol is added, and the reaction mass heated to 100° C. giving 210 ml of distillate and a slightly cloudy, pale yellow, viscous solution. The hot solution is diluted with enough dry ethanol to give 500 g of product (50% solids). A glass slide is coated as in Example I with similar results.

EXAMPLE VI

Preparation of Silane Modified Nylon 6/6

In a 250 ml round bottom flask equipped with a thermometer, mechanical stirrer, and distilling head are placed 58.0 g (0.50 mole) hexamethylene diamine, 69.6 g (0.40 mole) dimethyl adipate, and 5.0 ml of 25% sodium methoxide in methanol. The mixture is gradually heated to 160° C. under nitrogen with removal of the evolved methanol. After 16 hours at 160° C., IR analysis of the viscous, yellow oil reveals amide bands at 1645 and 1540 cm$^{-1}$ and the absence of ester bands at 1750 cm$^{-1}$.

To the hot reaction mixture is added 41.6 g (0.20 mole) of 2-carbomethoxyethyltrimethoxysilane, and the reaction was held at 160° C. with removal of the evolved methanol for 2 hours. IR analysis of the viscous, yellow oil shows the absence of an ester band at 1740 cm$^{-1}$. IR (melt) 3350, 2980, 1645, 1540, 1100, 960, and 810 cm$^{-1}$.

After cooling to 100° C., the reaction mixture is diluted with 90 g of 1,4-dioxane to give a viscous yellow solution that is 65% solids. A glass slide dipped into this solution and cured at 100° C. for 1 hour produced a strongly bound, hard, yellow film that does not dissolve in boiling water or boiling ethanol.

EXAMPLE VII

Preparation of a Silane Modified Silicone

A solution of 20.8 g (0.10 mole) of carbomethoxyethyltrimethoxysilane, 1.0 ml of 25% sodium methoxide in methanol, and 100 g of 3-aminopropyl functional polydimethyl siloxane containing 1.0 meq.-NH$_2$/g polymer (viscosity=1000 cps) is gradually heated to 160° C. under nitrogen. After 2 hours at 160° C., 4 ml of alcohol distillate is collected, and IR analysis of the viscous yellow oil shows the absence of ester bands at 1740 cm$^{-1}$. IR (neat film) 3350, 2860, 1650, 1540, 1260, 1100, 960, 805 cm$^{-1}$. A glass slide dipped into a 10% solution of this product in ethanol is cured at 100° C. for one hour. The resulting hard, clear film is not affected by boiling water, and it is reversibly softened by boiling ethanol.

What is claimed is:

1. The reaction product of (a) an aminofunctional polymer having the structure:

Polymer—(NH$_2$)$_n$ wherein "polymer" is selected from (CH$_2$CH$_2$NH)$_{2\text{-}100}$; (CH$_2$—CH$_2$—O)$_{2\text{-}100}$; (CH$_2$CH(CH$_3$)—O—)$_{2\text{-}100}$; copolymers of propylene glycol and ethylene glycol; (NH$_2$—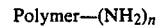—CH$_2$—)$_{2\text{-}100}$; (Si—O—)$_{2\text{-}100}$ and n is a whole number from 1 to 10, and (b) an alkoxysilane having the general formula:

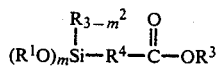

wherein $R^1$, $R^2$ and $R^3$ are independently selected from $C_1$-$C_8$ monovalent hydrocarbyl radicals, $R^4$ is alkylene containing from 1 to 3 carbon atoms and m is a whole number from 1 to 3; the number of moles of (b) being no greater than n; and said reation being carried out in a dry environment at a temperature of from 90° C. to 160° C., and the molar ratio of (b) to (a) being from 1:2 to 10:1.

2. A product having the general formula:

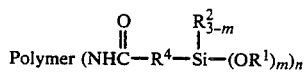

wherein "polymer" is selected from $(CH_2CH_2NH)_{2\text{-}100}$; $(CH_2{-}CH_2{-}O)_{2\text{-}100}$; $(CH_2CH(CH_3){-}O{-})_{2\text{-}100}$; copolymers of propylene glycol and ethylene glycol; $(NH_2{-}\emptyset{-}CH_2{-})_{2\text{-}100}$; and $(Si{-}O{-})_{2\text{-}100}$; $R^1$ and $R^2$ are independently selected from $C_1$-$C_8$ monovalent hydrocarbyl radicals; $R^4$ is an alkylene radical containing from 1 to 3 carbon atoms; n is a whole number from 1 to 10; and m is a whole number from 1 to 3.

3. A reaction product as defined in claim 1 wherein $R^1$ is ethyl.

4. A product as defined in claim 2 wherein $R^1$ is ethyl.

5. A reaction product as defined in claim 1 wherein $R^1$ is ethyl and m is 3.

6. A product as defined in claim 2 wherein $R^1$ is ethyl and m is 3.

7. A reaction product as defined in claim 1 wherein $R^1$ and $R^3$ are each ethyl.

8. A product as defined in claim 2 wherein $R^1$ and $R^2$ are each ethyl.

9. A reaction product as defined in claim 1 wherein component (b) is 2-carboethoxyethyltrialkoxysilane.

10. A reaction product as defined in claim 1 wherein component (a) is a polyethyleneimine.

11. A reaction product as defined in claim 10 wherein the polyethyleneimine has a molecular weight of about 600.

12. A process for making a product having the general formula:

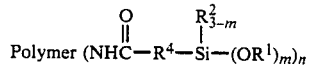

wherein "polymer" is selected from $(CH_2CH_2NH)_{2\text{-}100}$; $(CH_2{-}CH_2{-}O)_{2\text{-}100}$; $(CH_2CH(CH_3){-}O{-})_{2\text{-}100}$; copolymers of propylene glycol and ethylene glycol; $(NH_2{-}\emptyset{-}CH_2{-})_{2\text{-}100}$; and $(Si{-}O{-})_{2\text{-}100}$; $R^1$ and $R^2$ are independently selected from $C_1$-$C_8$ monovalent hydrocarbyl radicals; $R^4$ is an alkylene radical containing from 1 to 3 carbon atoms; n is a whole number from 1 to 10; and m is a whole number from 1 to 3, which comprises reacting in a dry environment at a temperature of from 90° C. to 160° C. (a) an aminofunctional polymer having the structure:

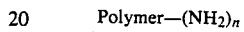

wherein "polymer" is as defined above, with an amount no more than stoichiometrically equivalent to n of (b) an alkoxysilane having the general formula:

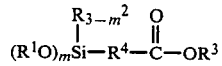

where $R^1$, $R^2$ and $R^4$ are as defined above and $R^3$ is a $C_1$-$C_8$ monovalent hydrocarbyl radical, the molar ratio of (b) to (a) being from 1:2 to 10:1.

13. A process as defined in claim 12 wherein the reaction is carried out in the presence of a dry alkanol containing from 1 to 3 carbon atoms.

14. A process as defined in claim 3 wherein the reaction mass is further characterized by the presence therein of an alkali metal alkoxide.

15. A process as defined in claim 14 wherein the alkali metal alkoxide is sodium methoxide.

16. A process as defined in claim 14 wherein $R^4$ is ethylene.

17. A process as defined in claim 16 wherein the (b) component is dissolved in anhydrous methanol, the reaction mass is characterized by the presence therein of sodium methoxide and the reaction mass is heated to distill off alcohol prior to the addition of component (a).

* * * * *